United States Patent [19]

Dillehay

[11] Patent Number: 5,061,409

[45] Date of Patent: Oct. 29, 1991

[54] EXTRUSION OF IMPACT AND FRICTION SENSITIVE HIGHLY ENERGETIC MATERIALS

[75] Inventor: David R. Dillehay, Marshall, Tex.

[73] Assignee: Thiokol Corporation, Ogden, Utah

[21] Appl. No.: 407,176

[22] Filed: Sep. 14, 1989

[51] Int. Cl.$^5$ .................... C06B 21/00; D01D 21/00
[52] U.S. Cl. .................................. 264/3.3; 86/20.12; 149/19.92
[58] Field of Search ................. 86/20.12; 366/29; 264/3.3; 149/19.92

[56] References Cited

U.S. PATENT DOCUMENTS

| | | | |
|---|---|---|---|
| 4,113,811 | 9/1978 | Helfgen et al. | 264/3 |
| 4,746,220 | 5/1988 | Sukai et al. | 366/79 |
| 4,767,577 | 8/1988 | Müller et al. | 264/3.3 |

*Primary Examiner*—Peter A. Nelson
*Assistant Examiner*—Chrisman D. Carroll
*Attorney, Agent, or Firm*—Lawrence I. Field; Ronald L. Lyons

[57] ABSTRACT

Substituting non-metallic screw elements for the previously used metal screw elements in twin-screw extruders reduces the hazards inherent in the extrusion of highly energetic materials which exhibit impact and friction sensitivity when processed in twin screw extruders with metal screw elements.

2 Claims, No Drawings

EXTRUSION OF IMPACT AND FRICTION SENSITIVE HIGHLY ENERGETIC MATERIALS

Many pyrotechnic compositions are friction sensitive, particularly to metal-to-metal friction. Since it is becoming common to process such compositions in extruders, the sensitivity of such compositions to friction and impact is a matter of growing concern.

This invention relates to the processing of materials which exhibit a high sensitivity to impact and friction, and expecially to materials which may be designated as highly energetic materials.

More particularly, this invention relates to the extrusion of propellants, explosives, pyrotechnic compositions and similar materials which present safety hazards when processed in mixers or extruders. The sensitivity of such materials to friction and impact when processed in metallic apparatus is an increasingly important problem in the manufacture of such highly energetic materials.

Briefly it has been found that substituting non-metallic screw elements for the previously used metal screw elements on cantilevered shafts or shafts which are supported at both ends in twin-screw extruders reduces the hazard inherent in metal-to-metal contact of the screw elements when hard lumps or foreign objects are encountered in the processing of the highly energetic materials to which the present invention is applicable.

Conventional twin-screw extruders to which the present invention is applicable are well known, one such extruder being shown in Muller U.S. Pat. No. 4,525,313 issued June 25, 1985, the disclosure of which is incorporated in this application by this reference. Other known twin-screw extruders may also be used in the practice of this invention.

One specific example of the present invention is the processing of a boron/KNO₃ ignition composition which exhibits a friction sensitivity of 13.5 lb. in a standard friction tester using steel on steel. (The higher the number the less sensitive the material is to friction ignition). When one of the test surfaces was fabricated from Ryton—a polyphenyl sulfide polymer commercially available from Phillips Petroleum Co.—the friction sensitivity value increased to over 70 lb. (the maximum of the testing machine). The formulation tested comprised the following in parts by weight:

75 Potassium Nitrate
25 Boron
1 Vinylalcohol acetate resin binder (VAAR)

Other formulations which exhibit metal-to-metal friction sensitivity and which could advantageously be processed in extruders in which non-metallic screw elements are substituted for the usual metal screw elements include the following:

| | |
|---|---|
| Illuminant formulation | 50% Sodium nitrate |
| | 42% Magnesium powder |
| | 8% Polysulfide/epoxy binder |
| Red signal formulation | 50% Strontium nitrate |
| | 35% Magnesium powder |
| | 10% Polyvinyl chloride |
| | 5% VAAR Binder |
| Green signal formulation | 57% Barium nitrate |
| | 25% Magnesium powder |
| | 12% Polyvinyl chloride |
| | 6% VAAR Binder |
| White Signal formulation | 25% Barium nitrate |
| | 30% Strontium nitrate |
| | 31% Magnesium powder |
| | 9% Polyvinyl chloride |
| | 5% VAAR Binder |
| Decoy flare composition | 60% Magnesium powder |
| | 35% Polytetrafluoroethylene |
| | 5% Polyacrylic ester binder |

Other synthetic resins and resin compositions which may be used for the screw elements instead of polyphenyl sulphide include polyimides, polyamide-imide copolymers, and phenolics. However with composite propellants, the use of glass-filled resins should be avoided since they appear to increase the sensitivity of such compositions to friction. Other fillers such as carbon are not as unsuitable for propellants as glass filler in the resins from which the extruder elements are made.

I claim:

1. In the processing of highly energetic materials which exhibit a high sensitivity to impact and friction when processed in extruders with metal-to-metal contact between metal screw elements and metal barrels, the improvement which comprises substituting a non-metallic screw element for the metal screw element and extruding the highly energetic material in said extruder, wherein said screw element has a non-metallic exterior for the entire length of said element which comprises a polyphenyl sulfide polymer and said highly energetic material which exhibits a high sensitivity to impact and friction when processed in an extruder with metal-to-metal contact comprises an inorganic nitrate, an elemental fuel selected from the group consisting of Mg, Al and B and mixtures thereof, and a resin binder.

2. The method of claim 1 wherein the extruder is a twin-screw extruder.

* * * * *